(12) United States Patent
Jensen et al.

(10) Patent No.: US 10,116,524 B2
(45) Date of Patent: Oct. 30, 2018

(54) MACHINE-LEARNING OPTIMIZATION FOR COMPUTING NETWORKS

(71) Applicants: Wesley Howard Jensen, Round Lake, IL (US); Osamah Mohammed Ali, Vancouver, WA (US)

(72) Inventors: Wesley Howard Jensen, Round Lake, IL (US); Osamah Mohammed Ali, Vancouver, WA (US)

(*) Notice: Subject to any disclaimer, the term of this patent is extended or adjusted under 35 U.S.C. 154(b) by 117 days.

(21) Appl. No.: 15/444,578

(22) Filed: Feb. 28, 2017

(65) Prior Publication Data

US 2017/0250875 A1    Aug. 31, 2017

Related U.S. Application Data

(60) Provisional application No. 62/301,490, filed on Feb. 29, 2016.

(51) Int. Cl.

| | |
|---|---|
| *H04L 12/24* | (2006.01) |
| *H04L 12/825* | (2013.01) |
| *H04L 12/26* | (2006.01) |
| *H04L 12/729* | (2013.01) |
| *H04L 12/723* | (2013.01) |
| *H04L 12/721* | (2013.01) |

(52) U.S. Cl.
CPC .......... *H04L 41/16* (2013.01); *H04L 41/083* (2013.01); *H04L 41/0896* (2013.01); *H04L 43/0829* (2013.01); *H04L 43/0852* (2013.01); *H04L 45/123* (2013.01); *H04L 45/125* (2013.01); *H04L 45/507* (2013.01); *H04L 47/25* (2013.01); *H04L 41/142* (2013.01); *H04L 41/147* (2013.01); *H04L 43/106* (2013.01)

(58) Field of Classification Search
CPC ......... H04L 45/22; H04L 45/02; H04L 45/07; H04L 45/12; H04L 45/50; H04W 40/02; H04W 28/08
See application file for complete search history.

(56) References Cited

U.S. PATENT DOCUMENTS

| | | | | |
|---|---|---|---|---|
| 2001/0033570 | A1* | 10/2001 | Makam | H04J 14/0227 370/373 |
| 2008/0049649 | A1* | 2/2008 | Kozisek | H04L 45/125 370/310 |
| 2017/0331322 | A1* | 11/2017 | Tuerk | H02J 7/042 |
| 2018/0041420 | A1* | 2/2018 | Saad | H04L 45/22 |

* cited by examiner

*Primary Examiner* — Mewale A Ambaye
(74) *Attorney, Agent, or Firm* — Dunlap Bennett & Ludwig PLLC

(57) ABSTRACT

A machine-learning optimization of a plurality of networks is provided. The machine-learning optimization includes interconnecting an online platform providing a machine learning module, a core network of computers deploying novel software, and a plurality of Internet network service providers. The platform collects, via the software, performance data of the Internet networks, which the machine learning module utilizes to enhance performance and reduce the latency therein networks by taking into account thousands of real-time and historic latency and bandwidth metrics. Thereby the software continually selects an optimal path through the plurality of Internet networks.

11 Claims, 2 Drawing Sheets

MACHINE-LEARNING OPTIMIZATION FOR COMPUTING NETWORKS

CROSS-REFERENCE TO RELATED APPLICATION

This application claims the benefit of priority of U.S. provisional application number 62/301,498, filed 29 Feb. 2016, the contents of which are herein incorporated by reference.

BACKGROUND OF THE INVENTION

The present invention relates to computing networks and, more particularly, to a machine-learning optimization of networking based upon a multitude of performance metrics.

Current computing networks and their associated networking equipment are statically built to support the humanly estimated need of a given application or throughput requirement. They are also built in a very proprietary manner, thus forcing the user to use one service provider for all processes.

As a result, current computing networks and their associated networking equipment lack elasticity. While many advancements have begun to provide and "on demand" functionality, they do not solve for the current constraints on the flow of traffic through the network. Specifically, networking performance capable devices today are limited by simple routing protocols that are over a decade old. Moreover, the selection of routing or path is based on a per device basis, typically requiring proprietary licenses, and otherwise only working on devices of the same manufacturer.

In private-network services, such as MPLS or VPLS, there are Quality of Service capabilities that classify and prioritize traffic within the Wide Area Network Service Providers network, but this is completely within the confines of their completely owned and privatized networks. Furthermore, such private networks are predefined and weighted routes or paths built on a pre-constructed network.

The global Internet provides and even larger problem. Not one service provider can control or guarantee the end to end throughput and security of traffic across the open Internet. Some Internet provides provide improved caching and TCP optimization tactics, but the impact is minimal. This is what keeps customers loyal to their chosen private service provider networks; however, the drawback to loyalty is that Internet service providers do not rely on competitor networks for support during issues like congestion or outage.

Other networking platforms are completely proprietary. They rely on existing WAN and Internet infrastructure to follow pre-defined rules, not dynamic or learned applications. And so, if there is congestion on the internet many VPN or IPSec platforms will not see and are not able to dynamically react to congestion, packet loss, jitter, or latency. To date, VPN services see only two points, the origin and destination. As a result, high costs and complex configuration make these platforms cumbersome and undesirable.

All other devices that use VPNs, IPSec, GRE, Auto VPN, or any other site to site topologies, do not control the performance, latency, speed or quality of the entire end to end Internet path. Some control the selection of what local circuit to traverse, but have no control beyond that.

The issue of flow traffic through networks will only be acerbated by the expectations of today's data consumers, who demand the following: elasticity in their networks (when it is hard to predict network needs, for example: twitter, events or seasonal changes); configurability control (consumers want to do it ourselves; and now!); data security made easy and safe (even though security has become tougher and more complex to address); visibility of performance and instant reporting (i.e., consumer wants to know if they are getting what they purchased); and price compression paired with an increase in capacity and improvement of performance.

As can be seen, there is a need for a machine-learning optimization of networking based upon a multitude of performance metrics, also or at times impacting equipment configurations. The optimization of traffic flow of the present invention is delivered through the creation of data flows and device profiles using machine learning adapted to provide real-time application. Unlike other service providers or equipment manufacturers today, the present invention empowers the customer to deploy and manage their domestic and global networks and associated equipment agnostically, yet securely and instantly with little or no communications from the provider of the present invention, and where consumers can also remove or disconnect at their leisure.

The present invention provides a platform that empowers the user to instantly stand up a secure and reliable domestic or global network, thereby bypassing the "brick and mortar" service provider model and lengthy timeframes to deploy. The empowering software of the present invention may be deployed in a plurality of data centers across the globe, wherein software defined gateways may be powered by machine learning artificial intelligence. The software of the present invention can also be deployed on local and on-site equipment as well.

The platform utilizes the collected performance data via a machine learning module to enhance performance and reduce the latency within the Internet, MPLS, VPLS and EoIP networks based on knowledge of the most common destination so as to create the best latency-based optimized route to minimize delay for real-time traffic, adding significant value to the WAN core traffic engineering and RSVP TE management.

Furthermore, the platform provides stronger security through the traffic behavior profiles that protect the user from anomalies by alerting the user to change in traffic patterns which could be caused by malware, a virus, or an unauthorized access.

The software of the present invention is adapted to establish a core network among a plurality of deployed data centers. In certain embodiments, endpoints interconnecting the core network with a plurality of Internet software provides, based upon in part a L2TP over IPSec negotiation, a machine learning module, which has taken into account thousands of real-time and historic metrics within less than two seconds. Through this process of optimizing Internet-based networks based upon real time and historic machine learned performance metrics, Internet service provider(s) are selected as optimal within the path of the initial connection for navigating the specific path of data as is passes through such service providers.

Once connected to the core network, the customer may be provided with options of stand up traditional services, such as MPLS, VPLS, and EoIP, over a completely optimized machine learning core network, leveraging L2TP over IPSec among the plurality of data center connections.

Based on the machine learning module provided through the platform a flow of data may route over 1, 2, 5, or 10+ different Internet service providers based purely upon obtaining the optimal performing route/path. This is a combination of IP transit connectivity coupled with the machine learning functionality, creating an artificially intelligent network.

The collected data predicts the growth in bandwidth requirements that is based upon current and past performance. This enables the planning ability for future expansion in hardware and software requirement.

The platform of the present invention is intuitive and easy to use as it predicts and executes performance enhancement and scalability functions. The platform provides an onramp to a customer evolving to full SDN (Software Defined Networking). Customers can use a variety of existing hardware and accomplish centralized SDN control and visibility through the use of our software.

SUMMARY OF THE INVENTION

In one aspect of the present invention, a computer-implemented method of optimizing data flow through a plurality of networks includes providing an online platform providing a machine learning module; interconnecting the online platform and a plurality of network providers via at least one computer having software for causing the at least one computer to perform the following process steps: (a) acquiring a list of open shortest path first (OSPF) neighbors; (b) acquiring a list of label distribution paths (LDP) neighbors; (c) executing for each OSPF neighbor a bandwidth test for collecting latency information thereof; (d) prompting the machine learning module to predict multiple path outcomes through the plurality of networks and calculate a confidence score of each path outcome based on latency information for associated OSPF neighbors; and (e) making routing decisions for each OSPF neighbor based on its respective confidence score.

In another aspect of the present invention, the computer-implemented method provides latency information that includes packet loss patterns through each OSPF neighbor, wherein each instance of packet loss is time stamped so that the software identifies sequential loss or maximum throughput of the each OSPF neighbor, wherein the confidence score is based upon historical information, further including the step of inspecting the confidence score via the software to tell the machine learning module whether it is correct or not, wherein if the confidence score is higher than 60 percent, then 80 percent of the collected latency information of step (c) is used by the software to determine a reliability value of each respective OSPF neighbor, wherein if the confidence score is less than 60 percent, then 50 percent of the collected latency information of step (c) is used by the software to determine a reliability value of each respective OSPF neighbor, and wherein OSPF neighbors comprises a list of objects including a router ID, a LSA types and an advertisement.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a machine-learning optimization of a plurality of networks. The machine-learning optimization includes interconnecting an online platform providing a machine learning module, a core network of networking devices such as routers, servers, firewalls and switches deploying novel software, and a plurality of Internet network service providers. The platform collects, via the software, performance data of the Internet networks, which the machine learning module utilizes to enhance performance and reduce the latency therein networks by taking into account thousands of real-time and historic latency and bandwidth metrics. Thereby the software continually selects an optimal path through the plurality of Internet networks.

The present invention may include at least one computer with a user interface, wherein the user interface may include a touchscreen or other input device and output device layered on the top of an electronic visual display of an information processing system. The information processing system may include Software Defined Networking (SDN) devices. The SDN may be a controller or other centralized device that allows for management and control of the network elements. The computer may include at least one processing unit coupled to a form of memory including, but not limited to non-user-interface computing devices, such as a server and a microprocessor, and user-interface computing devices, such as a desktop, a laptop, smart device, such as a tablet, a smart phone, smart watch, or the like, or a network device such as a router, server, switch or firewall. The software may include a program product including a machine-readable program code for causing, when executed, the computer to perform steps. The program product may include software which may either be loaded onto the device or accessed by the computer. The loaded software may include an application on a smart device. The software may be accessed by the computer using a web browser. The computer may access the software via the web browser using the internet, extranet, intranet, host server, internet cloud, wifi network, and the like. The software may include management software on a SDN (Software Defined Network) controller governing flow of data or a path. The SDN controller may be a network controlled by coded computing devices that impact and manage the network devices.

Figure 1:
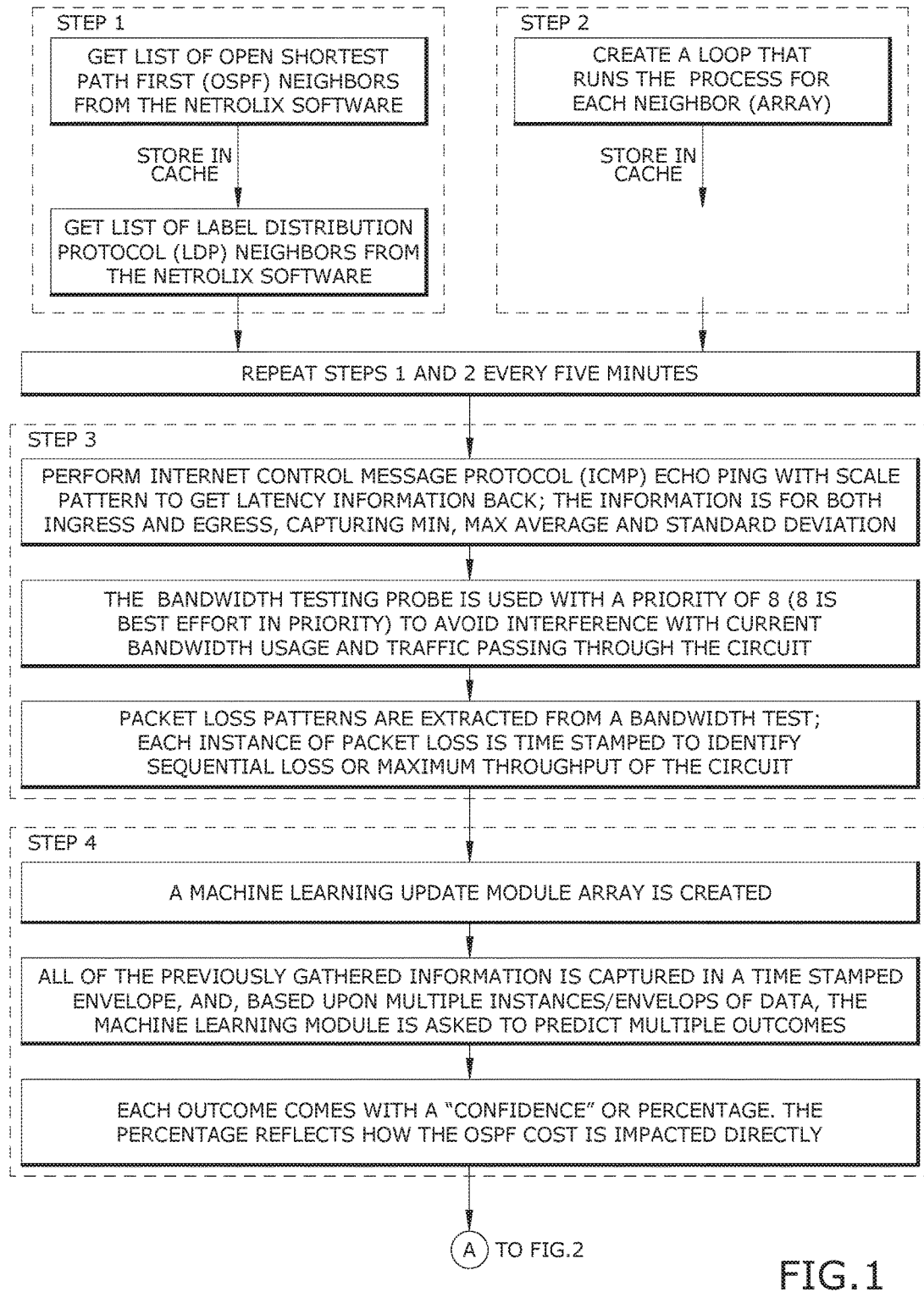
FIG. 1 is a flow chart of an exemplary embodiment of the present invention.
Figure 2:
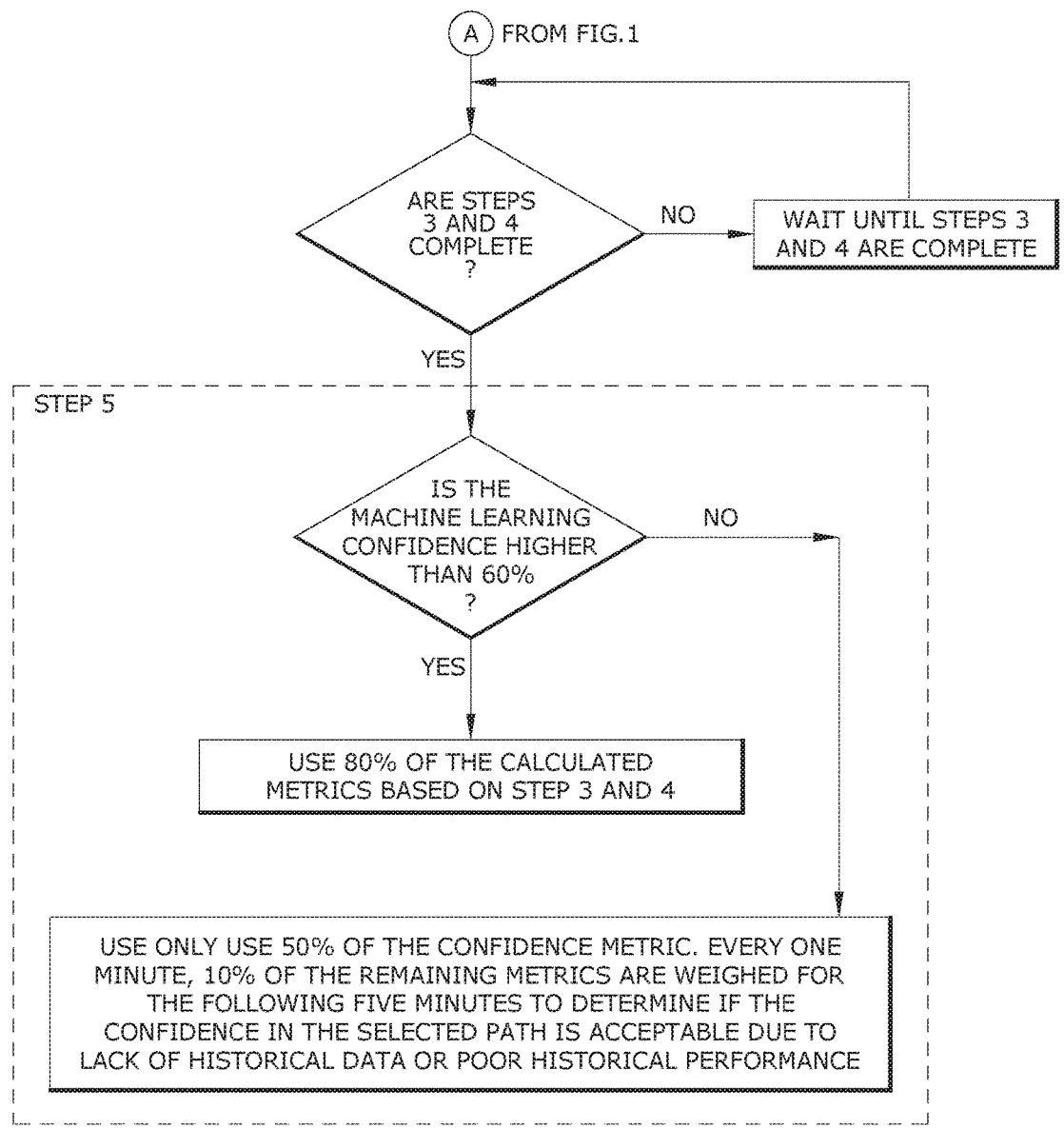
FIG. 2 is a continuation of FIG. 2.

Referring to FIGS. 1 and 2, the present invention may include acquiring a list of OSPF neighbors; acquiring a list of LDP (Label Distribution Protocol) neighbors; executing individual OSPF neighbor actions; creating and/or updating of machine-learning module array; making a routing decision; optimizing a path recalculation; and repeating the process. Neighbors may be a list of objects such as: router ID, LSA types and advertisement. There are 200 other factors within OSPF (RFC 2328) of the plurality of network providers. For LDP neighbors the present invention may look at the LSR ID and VPN v4 advertisement. This is part of the BGP functionality within MPLS architecture. A method of using the present invention may include the following. The software, platform and machine learning module disclosed above may be provided. The machine learning module or architecture underlying the core of the network is aware of and directly impacts a multitude of factors to the above fundamentally basic architecture.

In step 1, the present invention may acquire a list of OSPF neighbors. OSPF is an interior gateway protocol (IGP) for routing Internet Protocol (IP) packets solely within a single routing domain, such as an autonomous system. It gathers link state information from available routers and constructs a topology map of the network. The topology is presented as a routing table to the Internet layer which routes packets based solely on their destination IP address. OSPF supports Internet Protocol Version 4 (IPv4) and Internet Protocol Version 6 (IPv6) networks and supports the Classless Inter-Domain Routing (CIDR) addressing model.

In step 2, the present invention may acquire a list of Label Distribution Paths (LDP) neighbors. The Label Distribution Protocol (LDP) is a protocol defined by the IETF (RFC 5036) for the purpose of distributing labels in an MPLS environment. LDP relies on the underlying routing information provided by an IGP in order to forward label packets. The router forwarding information base, or FIB, is responsible for determining the hop-by-hop path through the network. Unlike traffic engineered paths, which use constraints and explicit routes to establish end-to-end Label Switched Paths (LSPs), LDP is used only for signaling best-effort LSPs.

In step 3, the present invention may execute for each OSPF neighbor an ICMP echo ping with scale pattern to obtain latency information. The information is used for both ingress and egress, and captures minimum/maximum, averages, standard deviation and other statistical information regarding of latency, thereby collecting, quantifying and capturing latency, packet loss, and jitter. Each OSPF neighbor may use a bandwidth testing probe with a priority of 8 (8 is "best effort" in priority) so that the bandwidth test will not interfere with current bandwidth usage and traffic passing through the circuit. While the bandwidth test runs, the software of the present invention captures the out interface total bandwidth. The same may be done for the upstream once the download is measured. The software of the present invention extract packet loss patterns from the bandwidth test, whereby each instance of packet loss is time stamped so that the software of the present invention can identify sequential loss or maximum throughput of the circuit.

In step 4, the present invention may create and/or update a machine learning module array wherein all of the previously gathered information is captured in a time stamped envelope. Based upon multiple instances/envelops of data, the machine learning module may be prompted to predict multiple outcomes, wherein each outcome may include a "confidence" or percentage. In certain embodiments, the OSPF cost of the network is then impacted directly based upon the "confidence" or percentage.

In step 5, the present invention may make routing decisions based at least in part on the related machine learning confidence. The confidence (or confidence score) may be based upon historical information. It is then inspected by the software to tell the machine learning module whether it is correct or not. Over time, confidence is impacted to determine the value or reliability of a given path or route in the relevant network. Wherein if the machine learning confidence is higher than 60%, we use the 80% of the calculated metrics based on step 3. If the machine learning confidence is less than 60%, the present invention only uses 50% of the confidence metric. The present invention may be adapted so that at every predetermined internal, for example every one minute, 10% of the remaining metrics are weighed for the following, say, five minutes to determine if the confidence within the selected path is acceptable. This function is due to either lack of historical data or poor historical performance.

In step 6, the present invention may recalculate the optimal path. If the immediately previous optimal path is no longer optimal, the present invention may be adapted to remove the traffic and route to the secondary calculated optimal path based on an OSPF cost.

The machine learning module may be only a portion of that. The software of the present invention may not rely solely on machine learning alone but upon our optimization options within step 3, thereby enabling the software to quality control (double check) the machine learning results. Especially since in initial stages of deployment and instances where there is not data yet gathered, the machine learning module may not yet be equipped to make any sort of educated decision Steps 1 through 6 may be repeated every predetermined period, for example every five minutes. The constant gathering of performance data done both in real-time as well as stored historically in the database enables rapid network route and performance optimization based on machine learning that can be done across large private networks as well as the Internet. Via the Internet and over the plurality of global data centers wherein the software of the present invention is deployed, the present invention is enable to leverage the above-mentioned software algorithm to navigate routes and control performance of data traversing potentially every Internet Service Provider across the globe.

Regarding the deployment of the present invention, the software may reside on servers provided by the plurality of global data centers, wherein it may be front-ended by a Software Defined Network (SDN) Management platform and related portal. An individual using this platform would simply use their browser to log on to the portal, create an account, and determine what wide area network services they wish to purchase such as MPLS, VPLS, or EoIP. This is done by simply clicking on the desired service icon and agreeing to the terms and conditions of the service. These services are then deployed on top of the underlying Internet or private infrastructure that is completely controlled, optimized and managed via the aforementioned software.

Unlike traditional MPLS, VPLS, or Private Line networks, the underlying fabric is constantly being optimized. Over the Internet a given path may leverage a path traversing three different Internet Service Providers due to that being the optimal path. Later that same flow of data may traverse five such Internet Service Providers if latency, throughput or reliability is more advantageous based upon the software and machine learning module decision. A user is completely unaware of the fluid software performance optimization. All they will see is a stable and reliable MPLS, VPLS, or Private Network connection.

Also, the software of the present invention can be deployed one equipment located on a local or on site customer premises. Metrics from the local device can be coupled with the software described herein to further optimize performance. The software can also control and the performance of IoT or Internet of Things-based services up to and including, network traffic aggregation and optimization of data flows to the respective aggregation point or data center.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A computer-implemented method of optimizing data flow through a plurality of networks, comprising:
providing an online platform providing a machine learning module;
interconnecting the online platform and a plurality of network providers via at least one computer having software for causing the at least one computer to perform the following process steps:
  (a) acquiring a list of open shortest path first (OSPF) neighbors of the plurality of network providers;
  (b) acquiring a list of label distribution paths (LDP) neighbors;
  (c) executing for each OSPF neighbor a bandwidth test for collecting latency information thereof;
  (d) prompting the machine learning module to predict multiple path outcomes through the plurality of networks and calculate a confidence score of each path outcome based on latency information for associated OSPF neighbors; and
  (e) making routing decisions for each OSPF neighbor based on its respective confidence score,
wherein if the confidence score is higher than 60 percent, then 80 percent of the collected latency information of step (c) is used by the software to determine a reliability value of each respective OSPF neighbor.

2. The method of claim 1, wherein the latency information includes packet loss patterns through each OSPF neighbor, wherein each instance of packet loss is time stamped so that the software identifies sequential loss or maximum throughput of the each OSPF neighbor.

3. The method of claim 1, wherein the confidence score is based upon historical information.

4. The method of claim 1, further comprising the step of inspecting the confidence score via the software to tell the machine learning module whether it is correct or not.

5. The method of claim 1, wherein if the confidence score is less than 60 percent, then 50 percent of the collected latency information of step (c) is used by the software to determine a reliability value of each respective OSPF neighbor.

6. The method of claim 1, wherein OSPF neighbors comprises a list of objects including a router ID, a LSA types and an advertisement.

7. A computer-implemented method of optimizing data flow through a plurality of networks, comprising:
providing an online platform providing a machine learning module;
interconnecting the online platform and a plurality of network providers via at least one computer having software for causing the at least one computer to perform the following process steps:
  (f) acquiring a list of open shortest path first (OSPF) neighbors of the plurality of network providers;
  (g) acquiring a list of label distribution paths (LDP) neighbors;
  (h) executing for each OSPF neighbor a bandwidth test for collecting latency information thereof;
  (i) prompting the machine learning module to predict multiple path outcomes through the plurality of networks and calculate a confidence score of each path outcome based on latency information for associated OSPF neighbors; and
  (j) making routing decisions for each OSPF neighbor based on its respective confidence score,
wherein if the confidence score is less than 60 percent, then 50 percent of the collected latency information of step (c) is used by the software to determine a reliability value of each respective OSPF neighbor.

8. The method of claim 7, wherein the latency information includes packet loss patterns through each OSPF neighbor, wherein each instance of packet loss is time stamped so that the software identifies sequential loss or maximum throughput of the each OSPF neighbor.

9. The method of claim 7, wherein the confidence score is based upon historical information.

10. The method of claim 7, further comprising the step of inspecting the confidence score via the software to tell the machine learning module whether it is correct or not.

11. The method of claim 7, wherein OSPF neighbors comprises a list of objects including a router ID, a LSA types and an advertisement.

* * * * *